United States Patent
Wu

(10) Patent No.: US 8,736,989 B2
(45) Date of Patent: May 27, 2014

(54) LENS MODULE HAVING OPAQUE ADHESIVE MEMBERS

(71) Applicant: Hon Hai Precision Industry Co., Ltd., New Taipei (TW)

(72) Inventor: Cheng-Shiun Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/730,862

(22) Filed: Dec. 29, 2012

(65) Prior Publication Data

US 2014/0078606 A1    Mar. 20, 2014

(30) Foreign Application Priority Data

Sep. 14, 2012 (TW) ............................. 101133597 A

(51) Int. Cl.
*G02B 7/02* (2006.01)
(52) U.S. Cl.
USPC ............................ 359/827; 359/819; 359/811
(58) Field of Classification Search
USPC .................................................. 359/811–830
See application file for complete search history.

(56) References Cited

U.S. PATENT DOCUMENTS

| | | | | |
|---|---|---|---|---|
| 8,320,059 | B2 * | 11/2012 | Lin | 359/740 |
| 8,570,672 | B2 * | 10/2013 | Lin | 359/811 |
| 2011/0149419 | A1 * | 6/2011 | Wu | 359/819 |

* cited by examiner

*Primary Examiner* — Mohammed Hasan
(74) *Attorney, Agent, or Firm* — Novak Druce Connolly Bove + Quigg LLP

(57) ABSTRACT

A lens module includes a lens barrel, a first lens, a second lens, a first opaque adhesive member, and a second opaque adhesive member. The first lens is received in the lens barrel and includes a first image-side surface and a first object-side surface. The second lens is received in the lens barrel and includes a second image-side surface and a second object-side surface. The first opaque adhesive member is coated on the first image-side surface and bonds the first and second lenses together. The first opaque adhesive member absorbs stray light rays passing through a periphery of the first lens. The second opaque adhesive member is coated on the second image-side surface. The second opaque adhesive member absorbs stray light rays passing through a periphery of the second lens.

16 Claims, 1 Drawing Sheet

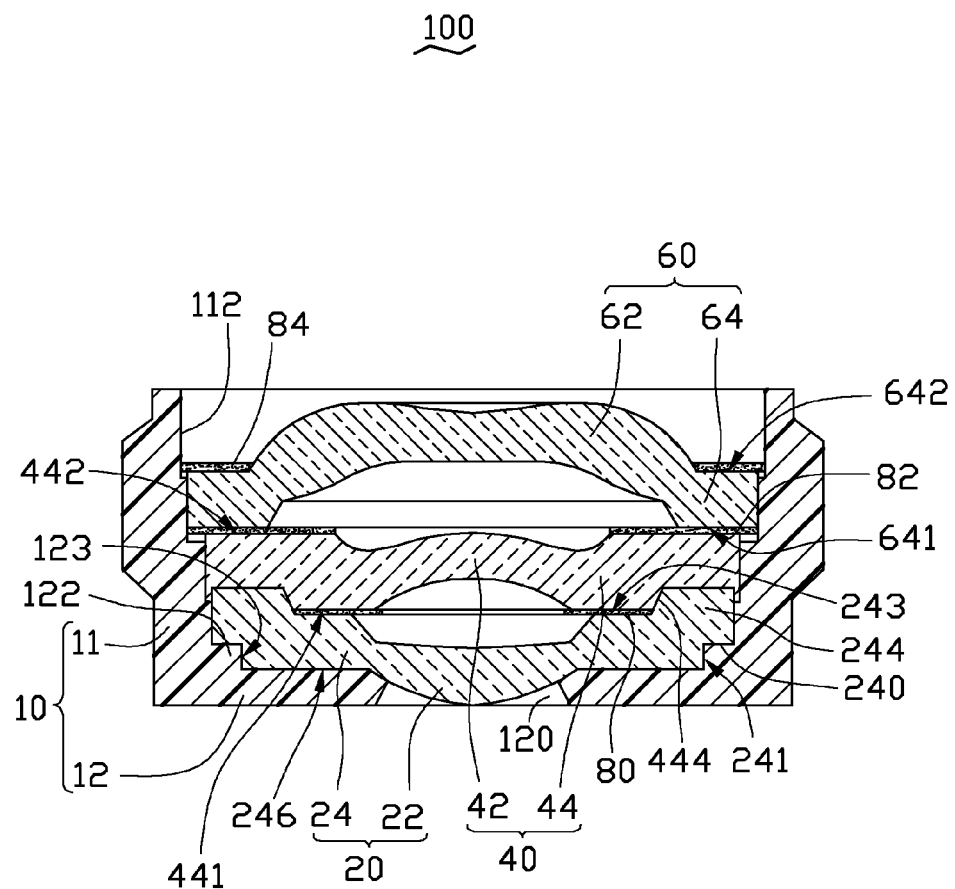

LENS MODULE HAVING OPAQUE ADHESIVE MEMBERS

BACKGROUND

1. Technical Field

The present disclosure relates to lens modules, and particularly to a lens module which has opaque adhesive members.

2. Description of Related Art

Lens modules are key members of a camera. A typical lens module includes a lens barrel with a plurality of lenses received in the lens barrel. In order to obtain a good quality image, an aperture plate is employed and is positioned on an image-side surface of one of the plurality of lenses and held by the lens barrel. In assembly, the circular circumferential surface of the aperture needs to be coated with glue using a glue needle to glue the aperture plate into the lens barrel and onto the corresponding lens. This is difficult and time-consuming work. Also, the aperture plate is hard to position with the circular shape of the circumferential surface.

Therefore, it is desirable to provide a lens module which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a cross-sectional view of a lens module, according to an exemplary embodiment.

DETAILED DESCRIPTION

The FIGURE shows a lens module 100, according to an exemplary embodiment. The lens module 100 includes a lens barrel 10, a first lens 20, a second lens 40, a third lens 60, a first opaque adhesive member 80, a second opaque adhesive member 82, and a second opaque adhesive member 84. The first lens 20, the second lens 40 and the third lens 60 are received in the lens barrel 10 in the order from the object-side to the image-side of the lens module 100.

The lens barrel 10 is a hollow cylinder in shape and includes a main body 11 and an annular aperture plate 12. The annular aperture plate 12 is positioned at the object-side end of the main body 11 and is integrally formed with the main body 11. The annular aperture plate 12 defines an aperture opening 120 at the center thereof to allow light rays from an object of interest (not shown) to enter the lens barrel 10. In particular, the aperture opening 120 tapers towards the image-side of the lens barrel 10, which is beneficial for controlling the angle of incident of the entering light rays. The main body 11 includes an inner sidewall 112. The inner sidewall 112 can efficiently absorb light rays incident thereupon to improve image quality of the lens module 100. In the present embodiment, an annular bulging portion 122 bulges upward from an inner surface of the annular aperture plate 12 and is integrally formed with the annular aperture plate 12.

The first lens 20 can be made of plastic or glass. In the present embodiment, the first lens 20 is made of plastic. The first lens 20 includes a first imaging portion 22 and a first non-imaging portion 24. The first imaging portion 22 is convex facing toward the aperture opening 120, and is configured for refracting light rays from an object and allowing them to pass to the second lens 40. The first non-imaging portion 24 surrounds the first imaging portion 22 and is configured for fixing to the inner sidewall 112 of the lens barrel 10. The first non-imaging portion 24 includes a first object-side surface 246 facing toward the aperture opening 120 and a first image-side surface 243 facing away from the first object-side surface 246. A first annular cutout 240 is defined along the periphery of the first object-side surface 246 of the first non-imaging portion 24 and is shaped corresponding to the bulging portion 122 of the lens barrel 10, so as to locate the first lens 20 onto the inner surface of the annular aperture plate 12. In addition, the bulging portion 122 of the lens barrel 10 and the first annular cutout 240 of the first lens 20 are capable of improving the positioning accuracy between the first lens 20 and the lens barrel 10. An annular flange 244 perpendicularly extends upward from the periphery of the first image-side surface 243 of the non-imaging portion 24.

In the embodiment, all of the first, second, and third opaque adhesive members 80, 82, and 84 are solid and are made of acrylate or methacrylate. The refractive index of the first, second, and third opaque adhesive members 80, 82, and 84 is 1.49. The first opaque adhesive member 80 is coated on the first image-side surface 243 of the first lens 20.

The second lens 40 can be also made of plastic or glass, and includes a second imaging portion 42 and a second non-imaging portion 44 surrounding the second imaging portion 42. In the present embodiment, the second lens 40 is also made of plastic. The second imaging portion 42 is concave facing toward the first lens 20 and can be spherical or aspherical. The second imaging portion 42 is configured for refracting incident light rays. The second non-imaging portion 44 is configured for fixing to the inner sidewall 112 of the lens barrel 10. The second non-imaging portion 44 includes a second object-side surface 441 facing toward the first lens 10 and a second image-side surface 442 facing away from the second object-side surface 441.

A second annular second cutout 444 is defined along the periphery of the second object-side surface 441 of the second non-imaging portion 44 and is shaped corresponding to the annular flange 244 of the first lens 20, so as to locate the second lens 40 onto the first image-side surface 243 of the first lens 20. The second lens 40 is directly positioned on the first image-side surface 243 by the first opaque adhesive member 80. The first opaque adhesive member 80 is configured to absorb stray light rays passing through the periphery of the first lens 20. In addition, the annular flange 244 of the first lens 20 and the second annular second cutout 444 of the second lens 40 are capable of improving the positioning accuracy between the first lens 20 and the second lens 40.

The second 82 is coated on the second image-side surface 442 of the second lens 40, and is configured to absorb stray light rays passing through the second lens 40, therefore improving the image quality of lens module 100.

The third lens 60 can be also made of plastic or glass, and includes a third imaging portion 62 and a third non-imaging portion 64 surrounding the third imaging portion 62. In the present embodiment, the third lens 60 is also made of plastic. The third imaging portion 62 is concaved toward the second lens 40 and can be spherical or aspherical. The third imaging portion 62 is configured for refracting incident light rays. The third non-imaging portion 64 is configured for fixing to the inner sidewall 112 of the lens barrel 10. The third non-imaging portion 64 includes a third object-side surface 641 facing toward the second lens 40 and a third image-side surface 642 facing away from the third object-side surface 641.

The third lens 60 is fixedly positioned on the second image-side surface 442 of the second lens 40 by the second opaque adhesive member 82. The second opaque adhesive member 82 is configured to absorb stray light rays passing through the periphery of the second lens 40. In the embodiment, the third opaque adhesive member 84 is coated on the third image-side surface 642 to absorb stray light rays passing through the periphery of the third lens 60, therefore improving the image quality of lens module 100.

In an alternative embodiment, the lens module 100 can include only the first lens 20 and the second lens 40, and the third lens 60 can be omitted.

In an alternative embodiment, the lens module 100 can include more than three lens. An opaque adhesive member is sandwiched between each two adjacent lenses.

Compared to typical lens module, an opaque adhesive member is sandwiched between each two adjacent lenses, thereby, omitting aperture plates and the gluing process.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
   a lens barrel;
   a first lens received in the lens barrel, the first lens comprising a first image-side surface and a first object-side surface facing away from the first image-side surface;
   a second lens received in the lens barrel, the second lens comprising a second image-side surface and a second object-side surface facing away from the second image-side surface;
   a first opaque adhesive member coated on the first image-side surface, the first opaque adhesive member bonding the first and second lenses together, the first opaque adhesive member configured to absorb stray light rays passing through a periphery of the first lens; and
   a second opaque adhesive member coated on the second image-side surface, the second opaque adhesive member configured to absorb stray light rays passing through a periphery of the second lens, wherein the lens barrel comprises a main body and an annular aperture plate positioned at an object-side end of the main body, the lens barrel comprises an annular bulging portion bulging from a periphery of an inner surface of the annular aperture plate, the first lens comprises a first imaging portion and a first non-imaging portion surrounding the first imaging portion, the first non-imaging portion comprises the first object-side surface facing toward the aperture opening and the first image-side surface facing away from the first object-side surface, the first lens defines a first annular cutout along a periphery of the first object-side surface and is shaped corresponding to the bulging portion of the lens barrel, and the first annular cutout receives the bulging portion, so as to locate the first lens onto the inner surface of the annular aperture plate.

2. The lens module of claim 1, wherein the annular aperture plate defines an aperture opening at its center.

3. The lens module of claim 2, wherein the aperture opening tapers towards an image-side of the lens barrel.

4. The lens module of claim 1, wherein the first imaging portion is convex facing toward the aperture opening.

5. The lens module of claim 1, wherein the first lens comprises an annular flange extending from a periphery of the first image-side surface, the second lens comprises a second imaging portion and a second non-imaging portion surrounding the second imaging portion, the second non-imaging portion comprises the second object-side surface facing toward the first lens and the second image-side surface facing away from the second object-side surface, the second lens defines a second annular cutout along a periphery of the second object-side surface of the second non-imaging portion and is shaped corresponding to the annular flange of the first lens, and the second annular cutout receives the annular flange, so as to locate the second lens onto the first image-side surface of the first lens.

6. The lens module of claim 5, wherein the second imaging portion is concave facing toward the first lens.

7. The lens module of claim 5, comprising a third lens, wherein the third lens is directly adhered on the second image-side surface of the second lens by the second opaque adhesive member.

8. The lens module of claim 7, wherein the third lens comprises a third imaging portion and a third non-imaging portion surrounding the third imaging portion, the third non-imaging portion comprises a third object-side surface facing toward the second lens and a third image-side surface facing away from the third object-side surface, the lens module comprises a third opaque adhesive member coated on the third image-side surface, and the third opaque adhesive member is configured to absorb stray light rays passing through a periphery of the third lens.

9. The lens module of claim 8, wherein the third imaging portion is concave facing toward the second lens.

10. The lens module of claim 1, wherein each of the first and second opaque adhesive members is made of acrylate or methacrylate.

11. The lens module of claim 1, wherein a refractive index of the first and second opaque adhesive members is 1.49.

12. A lens module, comprising:
    a lens barrel;
    a first lens received in the lens barrel, the first lens comprising a first image-side surface and a first object-side surface facing away from the first image-side surface;
    a second lens received in the lens barrel, the second lens comprising a second image-side surface and a second object-side surface facing away from the second image-side surface;
    a first opaque adhesive member coated on the first image-side surface, the first opaque adhesive member bonding the first and second lenses together, the first opaque adhesive member configured to absorb stray light rays passing through a periphery of the first lens; and
    a second opaque adhesive member directly coated on the second image-side surface, the second opaque adhesive member configured to absorb stray light rays passing through a periphery of the second lens.

13. The lens module of claim 12, wherein the first lens comprises an annular flange extending from a periphery of the first image-side surface, the second lens comprises a second imaging portion and a second non-imaging portion surrounding the second imaging portion, the second non-imaging portion comprises the second object-side surface facing toward the first lens and the second image-side surface facing away from the second object-side surface, the second lens defines a second annular cutout along a periphery of the second object-side surface of the second non-imaging portion and is shaped corresponding to the annular flange of the first lens, and the second annular cutout receives the annular flange, so as to locate the second lens onto the first image-side surface of the first lens.

14. A lens module, comprising:
    a lens barrel;

a first lens received in the lens barrel, the first lens comprising a first image-side surface and a first object-side surface facing away from the first image-side surface;

a second lens received in the lens barrel, the second lens comprising a second image-side surface and a second object-side surface facing away from the second image-side surface;

a first opaque adhesive member coated on the first image-side surface, the first opaque adhesive member bonding the first and second lenses together, the first opaque adhesive member configured to absorb stray light rays passing through a periphery of the first lens;

a second opaque adhesive member coated on the second image-side surface, the second opaque adhesive member configured to absorb stray light rays passing through a periphery of the second lens; and a third lens directly adhered on the second image-side surface of the second lens by the second opaque adhesive member.

15. The lens module of claim 14, wherein the third lens comprises a third imaging portion and a third non-imaging portion surrounding the third imaging portion, the third non-imaging portion comprises a third object-side surface facing toward the second lens and a third image-side surface facing away from the third object-side surface, the lens module comprises a third opaque adhesive member coated on the third image-side surface, and the third opaque adhesive member is configured to absorb stray light rays passing through a periphery of the third lens.

16. The lens module of claim 15, wherein the third imaging portion is concave facing toward the second lens.

* * * * *